June 1, 1926.
J. B. DANIEL, JR
1,587,067
GREASE CUP
Filed Dec. 29, 1924
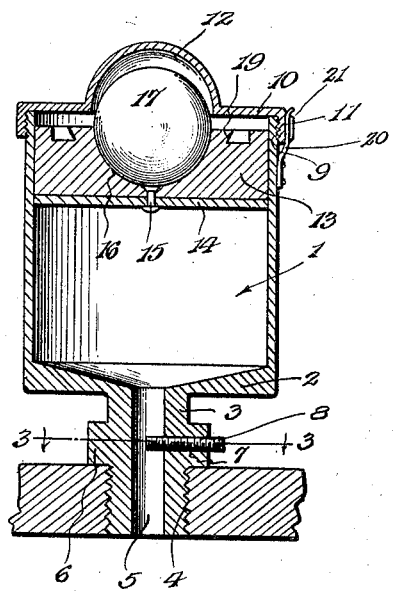
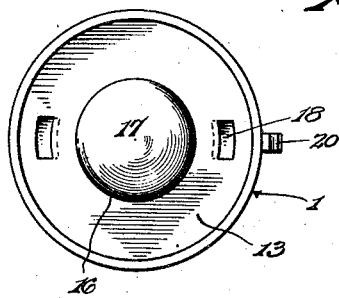
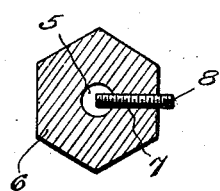
Inventor
J. B. Daniel, Jr.
By Lacey & Lacey, Attorney Patented June 1, 1926.

1,587,067

UNITED STATES PATENT OFFICE.

JOE B. DANIEL, JR., OF WOODLAND, GEORGIA.

GREASE CUP.

Application filed December 29, 1924. Serial No. 758,706.

This invention relates to improvements in grease cups and more particularly to that type which are designed primarily for use on crank shaft connecting rods, cross heads, etc., and one of the objects of the present invention is to provide a grease cup from which the grease will be fed to the bearing to be lubricated, in proper regulated quantities, and without the employment of springs for feeding the grease by pressure, as has heretofore been customary.

Another object of the invention is to provide a grease cup embodying a grease container or cup proper and a follower therein, and means for imposing weight upon the follower so as to cause the follower to exert the required pressure upon the grease to effect feeding of the grease from the cup to the bearing to be lubricated, and in this connection, the invention has as a further object to provide a follower and a weight imposing member both of which may be readily removed from the cup to permit of replenishment of the supply of lubricant in the cup and which may be readily re-introduced into the cup after the cup has been filled.

Another object of the invention is to provide a grease cup of the type stated which will be simple and substantial in construction and devoid of any springs for compressing the grease within the cup and which will, furthermore, be automatic and, therefore, will not require repeated adjustment.

In the accompanying drawings:

Figure 1 is a vertical sectional view through the grease cup embodying the invention.

Figure 2 is a top plan view of the cup with the closure cap removed.

Figure 3 is a horizontal sectional view on the line 3—3 of Figure 1, looking in the direction indicated by the arrows.

The device embodying the invention comprises a container or cup proper which is indicated in general by the numeral 1 and comprises a hollow cylindrical body having a bottom 2 provided centrally with a downwardly extending neck 3 the lower end portion of which is exteriorly threaded as at 4, to adapt it to be threaded into the usual threaded opening in the bearing to be lubricated, the neck being provided with a small bore 5 through which the grease is delivered to the bearing. The neck 3 is likewise provided exteriorly with a polygonal enlargement 6 to which a wrench may be adapted in order to permit of the threaded lower end portion of the neck being securely fitted into the opening in the bearing. In order to regulate the flow of grease from the cup through the bore 5, the enlarged portion of the neck is formed with a radial threaded opening 7, and fitted into the opening is a screw 8 which may be adjusted to cause its inner end portion to project a greater or less distance into the bore 5 and thus more or less close the bore and obstruct the flow of grease therethrough to a corresponding degree.

At its open top, the cup 1 is exteriorly threaded as indicated by the numeral 9, and a cap 10 is provided with a peripheral flange 11 interiorly threaded to fit the threads 9, the cap serving to close the upper end of the cup, and, for a purpose to be presently explained, being provided centrally with a hollow semi-spherical bulged portion 12. The numeral 13 indicates a circular follower which is of a diameter to adapt it to be fitted more or less snugly within the cup 1, and a disc 14 of felt or other suitable packing material is secured centrally to the under side of the follower 13 by means of a rivet 15 or any other suitable fastening element. The follower 13 is formed in its upper side, centrally, with an approximately semi-spherical seat 16, and a weight-imposing member, in the form of a spherical ball 17, of steel or other suitable metal, is disposed to rest freely in the seat 16, the bulge 12 serving to accommodate the upper side of the ball when the cup is filled with grease and the follower is at the upper end of the said cup, it being understood that by providing this bulge, the cup may be supplied with a maximum quantity of grease.

In order that the follower 13 may be readily handled in removing the same from the cup and replacing it, the said follower is formed in its upper side at diametrically opposite sides of the seat 16 with recesses 18 which preferably have their walls which are next adjacent the seat 16, undercut or beveled as at 19, whereby the finger nails of two of the fingers or of the thumb and one finger may be engaged in the recesses and with the said undercut walls for the purpose stated.

From the foregoing description of the invention, it will be seen that there is provided a grease cup of extremely simple construction and from which grease will be fed, under pressure, to the bearing to be lubricated. The weight-imposing ball 17 will, of course, impose weight upon the follower 13, and the mass of this ball and the mass of the follower will be sufficient to exert the required degree of pressure upon the mass of lubricant contained within the cup. As before stated, it has heretofore been customary to employ springs to act against followers in grease cups and thus insure of the follower exerting the required degree of pressure upon the grease contained within the cup, but these springs present various objections which are well known and which need not be herein outlined. Where attempts have been made to employ weight-imposing means in connection with a follower, it has been found that the follower will, at times, become stuck and the mass of the weight-imposing member is not sufficiently great, of itself, to loosen the follower and cause it to impose pressure upon the grease. This disadvantage is obviously overcome in the present invention for the weight-imposing ball 17, as stated, is freely seated in the seat 16, and as the cup is employed primarily upon crank shaft connection rod bearings, and cross heads, where the cup is continuously in motion, the weight imposing ball will be partially thrown from its seat at each stroke of the connecting rod, for example, and in returning to its seat will slightly jar the follower so as to insure against any sticking thereof. It will be understood, likewise, that the follower and weight-imposing ball can be readily removed from the cup at any time to permit of refilling of the cup and may equally as readily be again fitted into the cup.

In order to prevent loosening of the closure cap 10, a detent spring 20 is preferably secured to the side of the casing or container 1 and is engageable in a notch 22 provided in the periphery of the flange 11.

Having thus described the invention, what I claim is:

1. A lubricating device comprising a cup having an outlet for the lubricant contained therein, a follower in the cup having a substantially semi-spherical seat in its upper side, and a spherical weight-imposing member movably disposed within the seat.

2. A lubricating device comprising a cup having an outlet for the lubricant contained therein, a follower in the cup having a seat in its upper side of substantially semi-spherical contour, a weight imposing spherical member movably supported in the seat, and a closure for the cup having an upward bulge to accommodate the upper side of the weight-imposing member.

3. A lubricating device comprising a cup having an outlet for the lubricant contained therein, a follower in the cup, and a weight-imposing member movably supported upon the follower, the follower being provided in its upper side with diametrically oppositely located recesses having undercut walls for the engagement of the fingers in handling the follower.

In testimony whereof I affix my signature.

JOE B. DANIEL, Jr. [L. S.]